United States Patent [19]

Soula

[11] 4,168,242

[45] Sep. 18, 1979

[54] NOVEL ALKENYL-SUBSTITUTED OXA-AMINES AND THEIR USE AS ADDITIVES FOR LUBRICATING OILS AND FUELS

[75] Inventor: Gerard Soula, Meyzieu, France

[73] Assignee: Orogil, Courbevoie, France

[21] Appl. No.: 872,941

[22] Filed: Jan. 27, 1978

[30] Foreign Application Priority Data

Feb. 22, 1977 [FR] France .................. 77 05006

[51] Int. Cl.$^2$ .............................. C01M 1/32
[52] U.S. Cl. ................... 252/51.5 R; 44/75; 260/570.5 P; 260/573; 260/584 B; 260/584 C
[58] Field of Search ........... 252/51.5 R; 44/75; 260/570.5 P, 584 B, 584 C, 573

[56] References Cited

U.S. PATENT DOCUMENTS

| | | | |
|---|---|---|---|
| 1,923,178 | 8/1933 | Ulrich et al. ................ | 260/584 B |
| 3,448,154 | 6/1969 | Broadhead et al. ............ | 260/584 B |
| 3,449,432 | 6/1969 | Borstlap et al. ............ | 260/584 C |
| 3,527,804 | 9/1970 | Cyba ........................ | 252/51.5 R X |
| 3,755,433 | 8/1973 | Miller et al. .............. | 252/51.5 R |
| 3,844,958 | 10/1974 | Anderson et al. ........... | 252/51.5 R X |
| 3,876,704 | 4/1975 | Nakaguchi ................. | 260/584 B X |
| 3,884,821 | 5/1975 | Miller et al. ............. | 252/51.5 R |
| 3,996,285 | 12/1976 | Culbertson ................ | 260/584 C X |
| 4,049,716 | 9/1977 | Collet .................... | 252/51.5 R X |

*Primary Examiner*—Delbert E. Gantz
*Assistant Examiner*—Andrew Metz

[57] ABSTRACT

Novel compositions of matter comprising alkenyl amines are provided. They are prepared by the reaction of a halogenated polyolefin with at least one polyamine having an ether group, such as tris(6-amino-3-oxa-hexyl)amine, N,N-bis(6-amino-3-oxa-hexyl)ethanol amine, N-ethyi-N,N-bis(6-amino-3-oxa-hexyl)amine, etc.

The novel compositions of matter provide detergent-dispersant additives for use in lubricating oils and fuels.

20 Claims, No Drawings

NOVEL ALKENYL-SUBSTITUTED OXA-AMINES AND THEIR USE AS ADDITIVES FOR LUBRICATING OILS AND FUELS

BACKGROUND OF THE INVENTION

The present invention relates to new alkenyl amines, a method of preparing them, and their use as additives for lubricating oils and fuels.

It is already known to impart detergent-dispersant properties to lubricating oils and fuels by the addition of alkenyl amines of high molecular weight. For example, mention may be made of the alkenyl amines described in particular in French Pat. Nos. 1,410,399 and 1,410,400; British Pat. Nos. 1,378,708 and 1,378,709; Belgian Pat. 307,986; and U.S. Pat. Nos. 3,438,757, 3,844,958, 3,565,804, 3,873,277, 3,574,576, 3,873,460, 3,755,433, 3,876,704, 3,822,209, 3,884,821.

The present invention relates to a new class of alkenyl amines which impart particularly interesting detergent-dispersant properties to lubricating oils and fuels.

It is, therefore, an object of the present invention to provide novel alkenyl amines.

It is also an object of the present invention to provide novel lubricating oils and fuels containing the novel alkenyl amines as additives.

It is a further object of the invention to provide a novel process for providing alkenyl amines.

Other objects will be apparent to those skilled in the art from the present disclosure.

GENERAL DISCLOSURE OF THE INVENTION

The present invention has as its principal object compositions of matter which contain at least one alkenyl amine of the formula:

$$R''-N(R''')-CH_2-CH(R_1)-O-CH_2-CH(R_2)-CH_2-N(R')-R \qquad (I)$$

in which formula:
R represents a $C_{20}$ to $C_{350}$ alkenyl group and preferably a $C_{50}$–$C_{300}$ alkenyl group,
R' represents a hydrogen atom or the radical R,
$R_1$ and $R_2$ are identical or different and represent a hydrogen atom or a methyl radical,
R" represents a radical of the formula:

$$-CH_2-CH(R_1)-O-CH_2-CH(R_2)-CH_2-N(R'_1)-R'_2$$

in which $R'_1$ and $R'_2$ are identical or different and represent a hydrogen atom, or the radical R, or a radical of the formula:

$$-CH_2-CH(R_1)-OH$$

in which $R_1$ is as defined above,
R''' represents a radical of the formula:

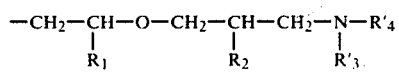

in which $R'_3$ and $R'_4$ are identical or different and represent a hydrogen atom, or the radical R, or radicals of the formulae:

$$-CH_2-CH(R_1)-OH$$

$$-CH_2-CH(R_2)-CH_2-N(R'_5)-R'_6$$

in which $R'_5$ and $R'_6$ are identical or different and represent a hydrogen atom or the radical R, or a $C_1$–$C_4$ alkyl group or a phenyl group.

The novel compositions of matter which are the object of the present invention may be prepared by the action of at least one amine of the formula:

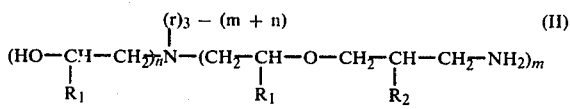

in which formula:
$R_1$ and $R_2$ have the definition given above,
r represents a radical of the formula:

$$-CH_2-CH(R_2)-CH_2-NH_2$$

or a $C_1$–$C_4$ alkyl radical, or a phenyl radical,
m is a whole number equal to 1, 2, or 3,
n is a whole number equal to 0, 1, or 2,
m+n being equal to 2 or 3,
with a halogenated polyolefin of the formula RX in which R has the definition given above and X represents chlorine or bromine, in a molar ratio of amine to halogenated polyolefin of between about 2:1 and 1:6, and preferably, between about 2:1 and 1:4, at a temperature between about 120° and 200° C., and preferably, between about 130° and 180° C.

The reaction may be carried out in the absence of solvent or in the presence of an inert solvent, such as xylene, octanol, etc., and of an acid-acceptor, such as sodium carbonate or bicarbonate, or lime, etc.

Among the halogenated polyolefins which can be used, mention may be made of the halogenated polypropylenes, the halogenated polybutylenes and, in particular, the polyisobutylenes of a molecular weight of between about 300 and 5,000, and preferably, between about 600 and 4,200, having 1 to 1.5 gram atoms of halogen per gram molecule of halogenated polyolefin.

Such halogenated polyolefins can be obtained by any conventional method for the halogenation of polyolefins, for instance, by thermal or photochemical chlorination or bromination.

The polyamines of formula II, above, can be prepared by the method described in U.S. Pat. No. 4,049,716, granted Sept. 20, 1977. The process consists of a cyanoethylation of an alkanolamine of the formula:

$$(r')_{3-p}-N-(CH_2-CH(R_1)-OH)_p \qquad (III)$$

in which formula:

R$_1$ has the definition given above, r' represents a hydrogen atom or a C$_1$-C$_4$ alkyl radical, or a phenyl radical, p is a whole number equal to 2 or 3, with acrylonitrile or methacrylonitrile, followed by hydrogenation of the nitrile or nitriles obtained.

Among the preferred polyamines of formula II, mention may be made of:

tris(3-oxa-6-amino-hexyl)amine,
N(ethyl)N,N bis(3-oxa-6-amino-hexyl)amine,
N(3-amino propyl)N,N bis(2-methyl-3-oxa-6-aminohexyl)amine,
tris(2-methyl-3-oxa-6-amino-hexyl)amine,
tris(2,5-dimethyl-3-oxa-6-amino-hexyl)amine,
tris(3-oxa-5-methyl-6-amino-hexyl)amine,
N(2-hydroxyethyl)N,N bis(3-oxa-6-amino-hexyl)amine,
N,N bis(2-hydroxyethyl)N(3-oxy-6-amino-hexyl)amine,
N(ethyl)N(2-hydroxyethyl)N(3-oxa-6-amino-hexyl)amine,
N(ethyl)N(2-hydroxyethyl)N(3-oxa-5-methyl-6-amino-hexyl)amine,
tris(3-oxa-5-methyl-6-amino-hexyl)amine,
N(2-hydroxyethyl)N,N bis(3-oxa-5-methyl-6-amino-hexyl)amine, and
N,N bis(2-hydroxyethyl)N(3-oxa-5-methyl-6-amino-hexyl)amine.

The present invention also relates to lubricating oils and fuels improved by the addition of a small percentage of their weight of the compositions of matter of the invention, imparting their excellent detergent-dispersant properties to the said oils and fuels. The said compositions furthermore impart antirusting and antifoaming properties to the lubricating oils.

The lubricating oils which can be used may be selected from among a very large number of lubricating oils, such as lubricating oils of naphthene base, paraffin base, and mixed base, other hydrocarbon lubricants, for instance, lubricating oils derived from coal products, and synthetic oils, such as, alkylene polymers, polymers of the alkylene oxide type and their derivatives, including the alkylene oxide polymers prepared by polymerizing alkylene oxide in the presence of water or alcohols, for example, ethyl alcohol, the esters of dicarboxylic acids, liquid esters of acids of phosphorous, alkyl benzenes and dialkyl benzenes, polyphenyls, alkyl biphenyl ethers, and silicon polymers.

The quantity of new additives to be added depends on the intended use to be made of the lubricating oil which is to be improved. Thus, for gasoline motor oil the amount of additive to be added will be from about 1 to 10%, while for an oil for a diesel engine, it will be from about 4 to 10%, by weight.

The improved lubricating oils may also contain additions of anti-oxidants, anti-corrosion agents, etc.

The fuels which can be used are hydrocarbons of the petroleum distillate type, such as automobile gasoline, aviation gasoline, fuels for diesel engines, fuel oil, etc. The quantity of new additives to be added is on the order of from about 5 to 6,000 ppm., and preferably, from about 40 to 2,000 ppm.

The improved fuels may also contain anti-knocking agents, other dispersing agents, purifiers for lead, anti-oxidants, anti-rust agents, antifreezes, demulsifiers, etc.

SPECIFIC DISCLOSURE OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified. Example 13 below is a comparison example.

EXAMPLE 1

The apparatus employed consists of a 4-liter, three-necked, round bottom flask provided with a mechanical agitator, a dip tube and a distillation system followed by two flasks, the first containing water and the second containing a 20% aqueous solution of sodium hydroxide.

2 kg. (about 2 mols) of polyisobutylene of a number average molecular weight of 960 is poured into the round bottom flask. It is heated to 110° C. and gaseous chlorine is introduced for 5 hours at that temperature.

Analysis shows a chlorine content of the resultant chlorinated polyisobutylene of 4.8% by weight.

EXAMPLE 2

The chlorination described in Example 1 is repeated but at a temperature of 110° C. by introducing gaseous chlorine for 3 hours into 2 kg. of polyisobutylene of number average molecular weight of 960.

Analysis shows a chlorine content of the resultant chlorinated polyisobutylene of 3.75% by weight.

EXAMPLE 3

The apparatus used in this example consists of a 3-liter, three-necked, round bottom flask provided with a mechanical agitator, a dip tube, and a condenser. 1360 g. (i.e., 1 mol) of polyisobutylene of number average molecular weight of 1360, and 1360 g. of carbon tetrachloride are poured into the round bottom flask. A crystal of iodine is added, whereupon gaseous chlorine is introduced at 40° C. for 3 hours (until the disappearance of the color due to the iodine).

The temperature is maintained for a further hour, whereupon the carbon tetrachloride is evaporated.

Analysis shows a chlorine content of the resultant chlorinated polyisobutylene of 3.1% by weight.

EXAMPLE 4

The apparatus employed in this example consists of a 2-liter, round bottom flask provided with a mechanical agitator, a dropping funnel, and a condenser.

1190 g. (i.e., 0.35 mol) of polyisobutylene of number average molecular weight of 3400 is poured into the round bottom flask and thereupon, 56 g. of bromine are added drop by drop at 90° C., within the course of 2½ hours. The system is allowed to degasify for one hour at the end of the reaction.

Analysis shows a bromine content of the resultant brominated polyisobutylene of 2.5% by weight.

EXAMPLE 5

Into a 1-liter, three-necked, round bottom flask provided with a mechanical agitator, a vertex, and a reflux condenser there are introduced, in succession:

(a) 207 g. (i.e., 0.2 mol) of chlorinated polyisobutylene prepared in accordance with Example 1,
(b) 15 g. of sodium carbonate,
(c) 21.5 g. (i.e., 0.67 mol) of tris(6-amino-3-oxa-hexyl)amine, which corresponds to a molar ratio of amine to chlorinated polyisobutylene of 0.33.

The mixture is heated at 160° C. for 15 hours. It is cooled to 90° C. and 250 cc. of a 10% aqueous sodium hydroxide solution is then added. It is refluxed for one hour, whereupon the mixture is transferred into a separating funnel. The two phases are separated after cooling. 350 cc. of xylene are added to the organic phase in order to favor the following separations. Six successive washings are effected with 250 cc. of water. 80 cc. of isopropanol may be added in order to promote the separation.

After filtration, the solvents are distilled off at 140° C. under a pressure of 20 mm. of mercury. A viscous washed product is obtained. Analysis of this product shows a content of:
a nitrogen content of 1.5%,
a residual chlorine content of 0.5%.

EXAMPLE 6

Into a 2-liter, three-necked, round bottom flask provided with a mechanical agitator, a vertex, and a reflux condenser there are introduced in succession:
(a) 1,007 g. (about 1 mol) of the chlorinated polyisobutylene prepared in Example 1,
(b) 15 g. of sodium carbonate, and
(c) 152 g. of a mixture of amines containing 75% of tris(6-amino-3-oxa-hexyl)amine and 25% of N,N bis(6-amino-3-oxa-hexyl)ethanolamine, which corresponds to a molar ratio of amine to chlorinated polybutylene of about 0.5.

The mixture is heated at 140° C. for 15 hours. It is cooled to 90° C. and thereupon 200 cc. of a 10% aqueous sodium hydroxide solution are added. The reaction mixture is then treated in the same manner as in Example 5. At the end of the treatment, one has a light product, analysis of which shows a content of:
2.1% nitrogen,
0.6% residual chlorine.

EXAMPLE 7

Into a 6-liter, three-necked, round bottom flask provided with a mechanical agitator, a vertex, and a reflux condenser, there are introduced in succession:
(a) 2800 g. (i.e., about 2 mols) of the chlorinated polyisobutylene prepared in Example 3,
(b) 215 g. of tris(6-amino-3-oxa-hexyl)amine (i.e., 0.67 mol), which corresponds to a molar ratio of amine to chlorinated polyisobutylene of 0.33.

The mixture is heated at 160° C. for 18 hours. It is cooled to 100° C. and 2 liters of a 10% aqueous sodium hydroxide solution are then added. The reaction mixture is then treated in the same manner as in Example 5. At the end of the treatment there is obtained a light product analysis of which shows a content of:
1.25% of nitrogen,
0.3% of residual chlorine.

EXAMPLE 8

Into a 10-liter, three-necked, round bottom flask provided with a mechanical agitator, a vertex, and a reflux condenser, there are introduced in succession:
(a) 3400 g. (namely, 1 mol) of the brominated polyisobutylene prepared in Example 4,
(b) 2.6 liters of xylene,
(c) 10 g. of sodium carbonate, and
(d) 145 g. of a mixture of amines containing 50 mol % of bis(6-amino-3-oxa-hexyl)ethanolamine and 50 mol % of tris(6-amino-3-oxa-hexyl)amine, which corresponds to a molar ratio of amine to brominated polyisobutylene of about 0.5.

The mixture is heated at 135° C. for 18 hours. It is cooled to 90° C. and 1 liter of an aqueous 10% sodium hydroxide solution is then added.

The reaction mixture is then treated in the same manner as in Example 5.

A light product is obtained analysis of which shows a content of:
0.65% nitrogen,
0.2% residual bromine.

EXAMPLE 9

Into a 10-liter, three-necked, round bottom flask provided with a mechanical agitator, a vertex, and a reflux condenser there are introduced in succession:
(a) 3400 g. (i.e., 1 mol) of the brominated polyisobutylene prepared in Example 4,
(b) 2.6 liters of xylene,
(c) 282 g. (i.e., 0.9 mol) of tris(6-amino-3-oxa-hexyl)amine, which corresponds to a molar ratio of amine to brominated polyisobutylene of 0.9.

The mixture is heated at 135° C. for 21 hours. It is cooled to 90° C. and thereupon 2 liters of an aqueous 10% solution of sodium hydroxide are added. The reaction mixture is treated by the method described in Example 5. A light product is obtained analysis of which shows a content of:
0.5% nitrogen,
0.1% residual bromine.

EXAMPLE 10

Into a 10-liter, three-necked, round bottom flask provided with a mechanical agitator, a vertex, and a reflux condenser, there are introduced in succession:
(a) 2880 g. (i.e., 3 mols) of the chlorinated polyisobutylene prepared in Example 2,
(b) 2 liters of xylene,
(c) 667 g. (i.e., 2.7 mols) of N-ethyl-N,N-bis(6-amino-3-oxa-hexyl)amine, which corresponds to a molar ratio of amine to chlorinated polyisobutylene of 0.9.

The mixture is heated at 135° C. for 18 hours. It is cooled to 90° C. and thereupon 2 liters of an aqueous 10% sodium hydroxide solution are added. The reaction mixture is then treated in the same manner as in Example 5. A light product is obtained, analysis of which shows a content of:
2.2% nitrogen,
0.2% residual chlorine.

EXAMPLE 11

Into a 6-liter, three-necked, round bottom flask provided with a mechanical agitator, a vertex, and a reflux condenser there are introduced in succession:
(a) 1035 g. (i.e., about 1 mol) of chlorinated polyisobutylene prepared in Example 1,
(b) 2.5 liters of octanol,
(c) 53 g. of sodium carbonate,
(d) 80 g. (i.e., 0.25 mol) of tris(6-amino-3-oxa-hexyl)amine, which corresponds to a molar ratio of amine to chlorinated polyisobutylene of 0.25.

The mixture is heated at 160° C. for 15 hours. It is cooled to 90° C. and thereupon 1 liter of an aqueous 10% solution of sodium hydroxide is added. It is refluxed for one hour, whereupon the mixture is transferred into a separating funnel and the two phases are separated. The organic phase of the mixture is then treated in the same manner as in Example 5. At the end of the treatment, a light product is obtained, analysis of which shows a content of:

0.9% nitrogen,
0.5% chlorine.

EXAMPLE 12

Into the apparatus described in Example 10 there are introduced in succession:
 (a) 3400 g. (i.e., 1 mol) of the brominated polyisobutylene prepared in Example 4,
 (b) 576 g. (i.e., 1.8 mol) of tris(6-amino-3-oxa-hexyl)amine which corresponds to a molar ratio of amine to chlorinated polyisobutylene of 1.8, and
 (c) 2 liters of octanol.

The mixture is heated at 160° C. for 15 hours. It is cooled to 90° C. and thereupon one liter of an aqueous 10% sodium hydroxide solution is added. The mixture is then treated in the same manner as in Example 5. At the end of the treatment there is obtained a light product, analysis of which shows a content of:

0.8% nitrogen,
0.1% bromine.

The following example, Example 13, is a comparison example, in accordance with the prior art:

EXAMPLE 13

Into the apparatus described in Example 11 there are introduced in succession:
 (a) 2070 g. (i.e., about 2 mols) of the chlorinated polyisobutylene prepared in Example 1,
 (b) 106 g. of sodium carbonate,
 (c) 189 g. (i.e., 1 mol) of tetraethylene pentamine, which corresponds to a molar ratio of amine to chlorinated polyisobutylene of 0.5.

The mixture is heated at 160° C. for 18 hours. It is cooled to 90° C. and thereupon two liters of an aqueous 10% sodium hydroxide solution are added. The reaction mixture is treated by the method described in Example 5.

Analysis of the finished product shows a content of:
1.43% nitrogen,
0.2% residual chlorine.

EXAMPLE 14

The products of the invention which were obtained in accordance with Examples 5 to 12, above, were tested with respect to their dispersing properties in lubricants. The study of the dispersing power was carried out in accordance with the spot method described in Volume I of A. Schilling's book, "Les huiles pour moteurs et le graissage des moteurs" (Motor oils and the lubrication of motors), 1962 edition, pages 89–90.

The method is carried out starting with 20 g. of SAE 30 oil to which there are added 5 g. of sludge coming from a Petter AV$_1$ engine containing about 2% carbonaceous matter.

There had been previously added to the SAE 30 oil (the quantities of the different additives being given for 1 kg of oil):
 (a) 50 mmols of the dispersant to be studied,
 (b) 30 mmols of calcium alkyl benzene sulfonate,
 (c) 30 mmols of super-alkalinized calcium alkyl phenate, and
 (d) 15 mmols of zinc dihexyldithiophosphate.

The mixture of treated oil and sludge is separated into five fractions which are agitated and subjected to the following five heat treatments:
 (a) one fraction subjected to heating at 50° C. for 10 minutes,
 (b) one fraction subjected to heating at 200° C. for 10 minutes,
 (c) one fraction subjected to heating at 250° C. for 10 minutes,
 (d) one fraction subjected to heating at 50° C. for 10 minutes in the presence of 1% water, and
 (e) one fraction subjected to heating at 200° C. for 10 minutes in the presence of 1% water.

One drop of each mixture obtained after the heat treatment was placed on filter paper.

The evaluation is effected at the end of 48 hours. For each spot there is calculated the percentage of dispersed product with respect to the spot of oil, by forming the ratio of the respective diameters of the spot of oil and the spot of the dispersed product. The higher the percentage of dispersed product, the better the dispersion with respect to the sludge.

Thus, the following evaluations are obtained, as set forth in the table appearing at the end of the present specification.

EXAMPLE 15

The anti-rust properties of the products of Examples 5 to 12 were tested in SAE 30 oil which had been treated by means of the formulation of the preceding example, namely, for 1 kg. of oil:
 (a) 50 mmols of the products of each of Examples 5 to 12,
 (b) 30 mmols of calcium alkyl benzene sulfonate,
 (c) 30 mmols of super alkalinized calcium alkyl phenate, and
 (d) 15 mmols of zinc dihexyldithiophosphate.

The principle of the test consists in adding to the oil under study the products which may be present in the blowby gases and which play a part in the formation of rust on the valve stem and tappet assembly and immersing a part, forming part of said assembly, into the resulting mixture for a certain period of time. The rust formed is evaluated visually.

The test is carried out by:
 (a) introducing 700 g. of oil into a round-bottom flask and heating at 50° C. with agitation,
 (b) successive addition, when the temperature has become stable, of 20 cc. of a 30% aqueous solution of formaldehydr, 4.5 cc. of methanol, 5 cc. of a 50/50 mixture of dichlorethane and dibromethane, and 8.5 cc. of a 78.5% aqueous nitric acid solution,
 (c) immersion for 19 hours of a piece of the valve stem and tappet assembly.

When there is no attack, a mark of 20 is assigned; when the attack is very substantial, a mark of 0 is assigned.

The results of the evaluations appear in the table appearing at the end of the present specification.

EXAMPLE 16

The anti-foam properties of the products of Examples 5 to 12 are measured in accordance with ASTM Standard D 892.63 in SAE 30 oil to which the formula indicated in Examples 14 and 15 has been added.

The results of the evaluations are set forth in the table appearing at the end of the present specification.

By way of comparison, the table appearing at the end hereof contains the results of the tests of the dispersing, anti-rust and anti-foam properties carried out under the conditions described in Examples 14 to 16 on a prior art alkenyl amine derived from the tetraethylene pentamine described in comparison Example 13, above.

TABLE

| Product of Example No. | PERFORMANCE | | |
|---|---|---|---|
| | Dispersion | Anti-rust | Anti-foam |
| 5 | 410 | 16 | 100–300 |
| 6 | 440 | 17 | 100–300 |
| 7 | 400 | 16 | 100–300 |
| 8 | 430 | 16 | 100–300 |
| 9 | 450 | 15 | 100–300 |
| 10 | 400 | 15 | 100–300 |
| 11 | 310 | 14 | 100–300 |
| 12 | 470 | 10 | 100–300 |
| 13 (Comparison) | 380 | 12 | 300–500 |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A composition of matter comprising at least one compound of the formula:

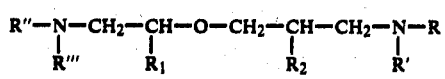

in which formula:
R represents a $C_{20}$–$C_{350}$ alkenyl group,
R' represents a member selected from a hydrogen atom and the radical R,
$R_1$ and $R_2$ represent a member selected from a hydrogen atom and a methyl radical,
R" represents a radical of the formula:

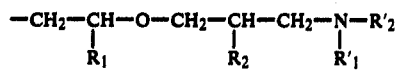

in which $R'_1$ and $R'_2$ represent a member selected from a hydrogen atom, the radical R and a radical of the formula:

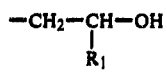

R''' represents a radical of the formula:

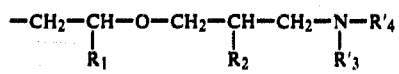

in which $R'_3$ and $R'_4$ represent a member selected from a hydrogen atom, the radical R, a radical of the formulae:

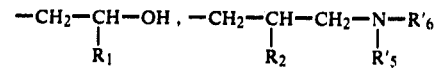

a $C_1$–$C_4$ alkyl group and a phenyl group, in which $R'_5$ and $R'_6$ represent a member selected from a hydrogen atom and the radical R.

2. A composition of matter in accordance with claim 1, characterized by the fact that it contains at least one alkenyl amine of formula (I) in which R represents a $C_{50}$–$C_{300}$ alkenyl group.

3. A composition of matter in accordance with claim 1, comprising the reaction product of at least one polyamine of the formula

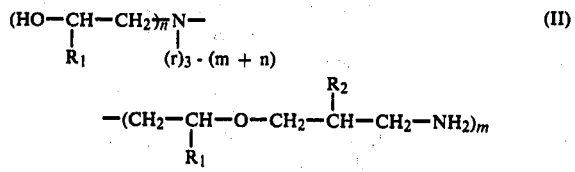

in which formula
$R_1$ and $R_2$ represent a member selected from a hydrogen atom and a methyl radical,
r represents a member selected from a radical of the formula:

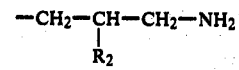

a $C_1$–$C_4$ alkyl radical, and a phenyl radical,
m is a whole number from 1 to 3
n is a number selected from 0, 1 and 2
m+n being equal to 2 or 3
with a halogenated polyolefin of the formula RX in which R represents a $C_{20}$–$C_{350}$ alkenyl group and X represents a halogen selected from chlorine and bromine.

4. A composition of matter in accordance with claim 1, comprising the reaction product of a halogenated polyolefin with at least one polyamine selected from the class consisting of tris(6-amino-3-oxa-hexyl)amine, N,N-bis(6-amino-3-oxa-hexyl)ethanolamine, and N-ethyl-N,N-bis(6-amino-3-oxa-hexyl)amine.

5. A composition of matter in accordance with claim 3 wherein the halogenated polyolefin is a member selected from the class consisting of chlorinated and brominated polyolefins.

6. A composition of matter in accordance with claim 3 wherein the halogenated polyolefin is a halogenated polyisobutylene.

7. A process for preparing a composition of matter in accordance with claim 1, which process comprises reacting at least one amine of the formula

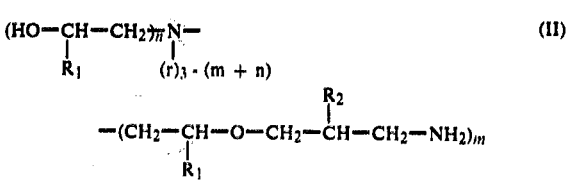

in which formula $R_1$ and $R_2$ represent a member selected from a hydrogen atom and a methyl radical, r represents a member selected from a radical of the formula:

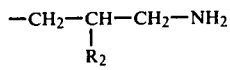

a $C_1$–$C_4$ alkyl radical, and a phenyl radical, m is a whole number from 1 to 3 n is a number selected from 0, 1 and 2 m+n being equal to 2 or 3 with a halogenated polyolefin of the formula RX in which R represents a $C_{20}$–$C_{350}$ alkenyl group and X represents a halogen selected from chlorine and bromine, in a molar ratio of amine to halogenated polyolefin of between about 2:1 and 1:6, at a temperature between about 120° and 200° C.

8. A process in accordance with claim 7, wherein the halogenated polyolefin contains from about 50 to 300 carbon atoms and from about 1 to 1.5 gram atom of halogen per gram molecule of halogenated polyolefin.

9. A process in accordance with claim 7, wherein the halogenated polyolefin is a member selected from polypropylene, a halogenated polybutylene, and a halogenated polyisobutylene.

10. A process in accordance with claim 7, wherein the molar ratio of amine to halogenated polyolefin is between about 2:1 and 1:4.

11. A process in accordance with claim 7, wherein the reaction of the amine of formula II with the halogenated polyolefin RX is carried out at a temperature between about 130° and 180° C.

12. A process in accordance with claim 7, wherein the amine of formula II is selected from among tris(6-amino-3-oxa-hexyl)amine, N,N-bis(6-amino-3-oxa-hexyl)ethanolamine, and N-ethyl-N,N-bis(6-amino-3-oxa-hexyl)amine.

13. A novel lubricating composition comprising a major proportion of at least one lubricating oil and between about 1 and 10% by weight of at least one composition of matter in accordance with claim 1.

14. A novel lubricating composition comprising a major proportion of at least one lubricating oil and between about 1 and 10% by weight of at least one composition of matter in accordance with claim 2.

15. A novel lubricating composition comprising a major proportion of at least one lubricating oil and between about 4 and 10% by weight of at least one composition of matter in accordance with claim 1.

16. A novel lubricating composition comprising a major proportion of at least one lubricating oil and between about 4 and 10% by weight of at least one composition of matter in accordance with claim 2.

17. A fuel oil composition comprising a major proportion of at least one fuel oil and between about 5 and 6,000 parts per million by weight of at least one composition of matter in accordance with claim 1.

18. A fuel oil composition comprising a major proportion of at least one fuel oil and between about 5 and 6,000 parts per million by weight of at least one composition of matter in accordance with claim 2.

19. A fuel oil composition comprising a major proportion of at least one fuel oil and between about 40 and 2,000 parts per million by weight of at least one composition of matter in accordance with claim 1.

20. A fuel oil composition comprising a major proportion of at least one fuel oil and between about 40 and 2,000 parts per million by weight of at least one composition of matter in accordance with claim 2.

* * * * *